2,923,555

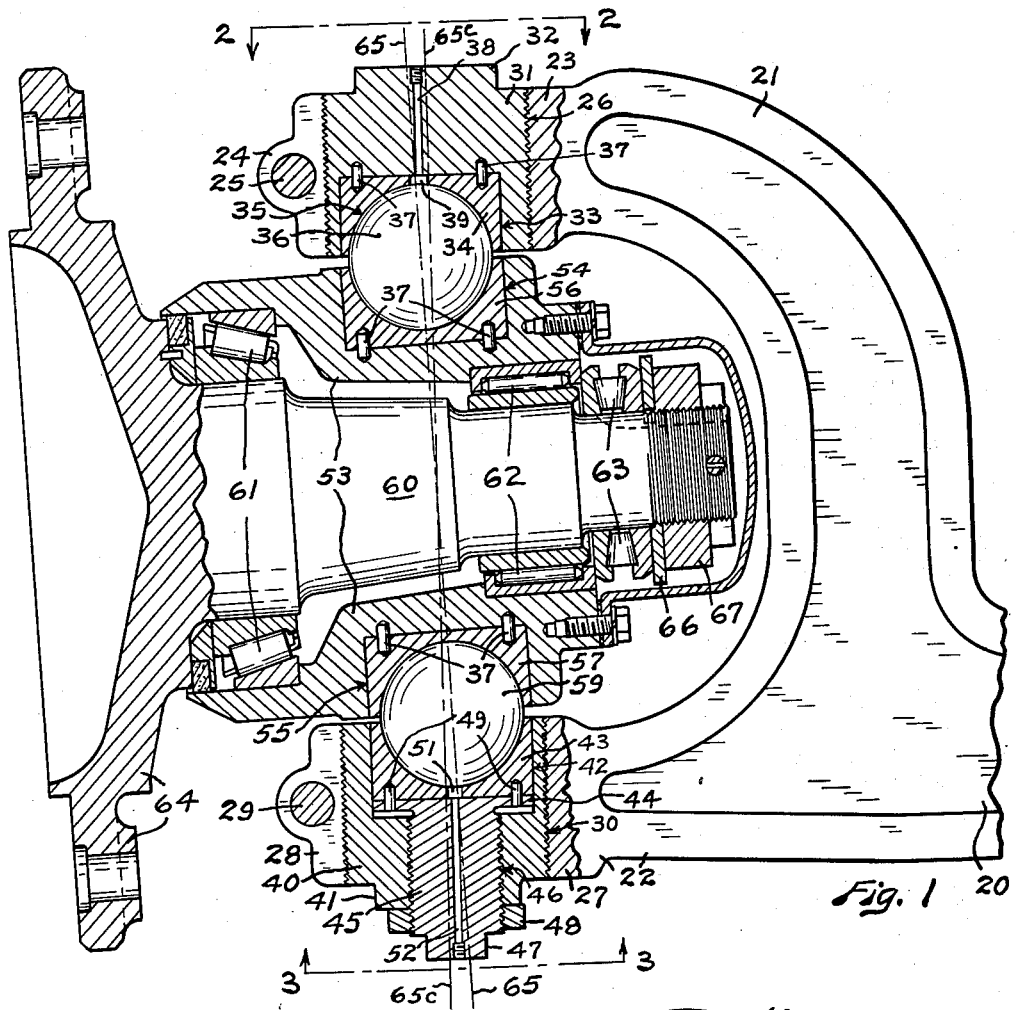
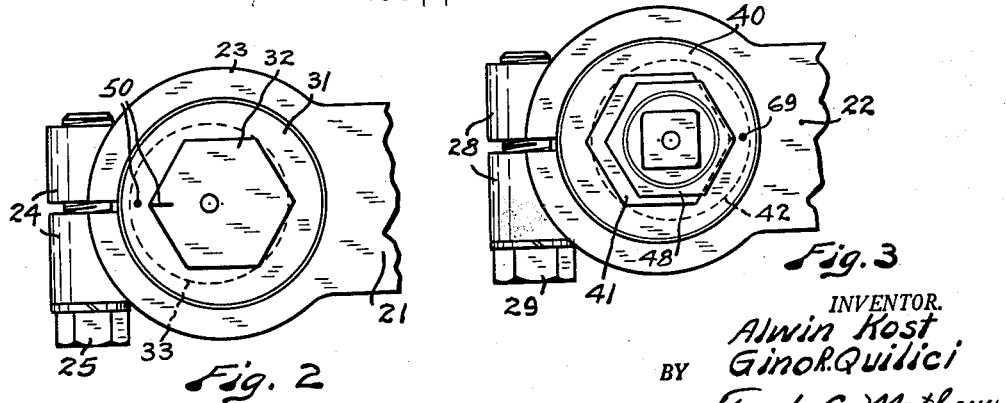
Fig. 1
Fig. 2
Fig. 3
INVENTOR.
Alwin Kost
Gino R. Quilici
BY
Fred C. Matheny
ATTORNEY

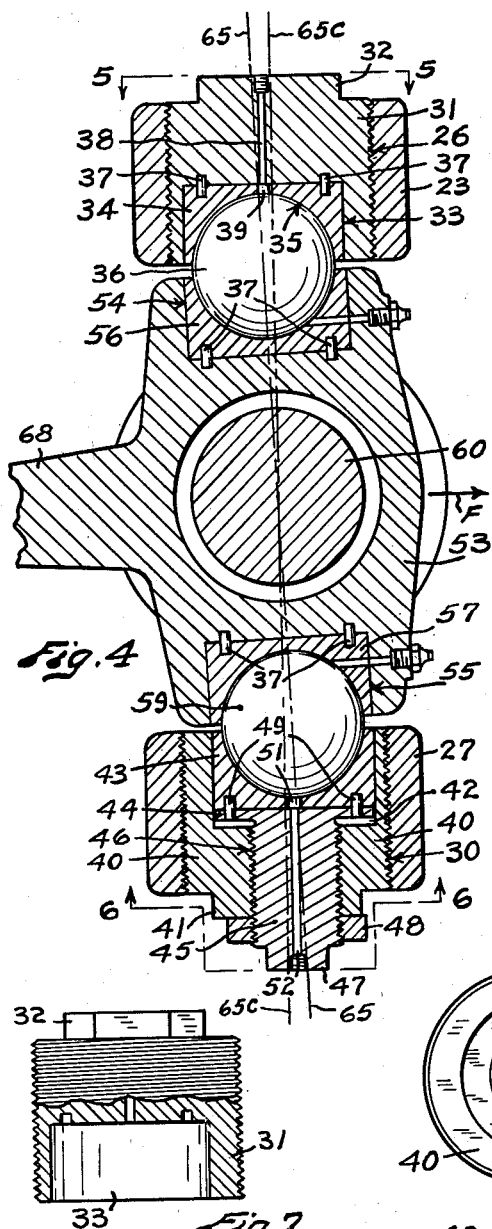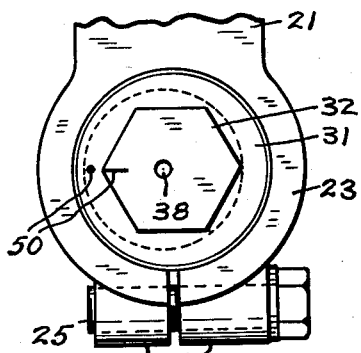
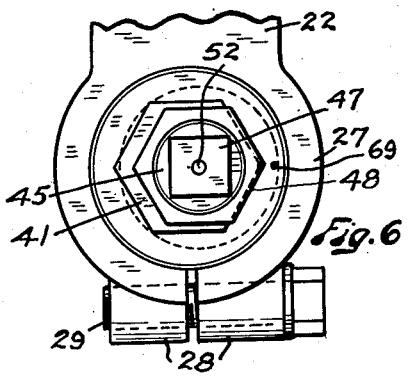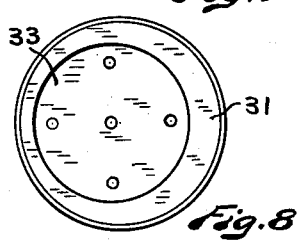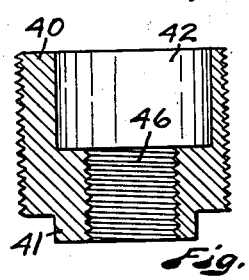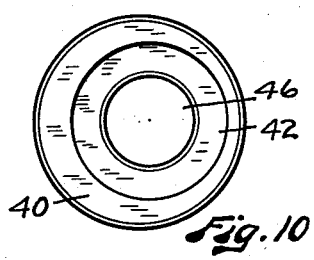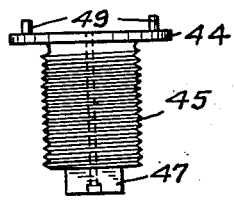
INVENTOR.
Alwin Kost
Gino R. Quilici
BY Fred C Matheny
ATTORNEY

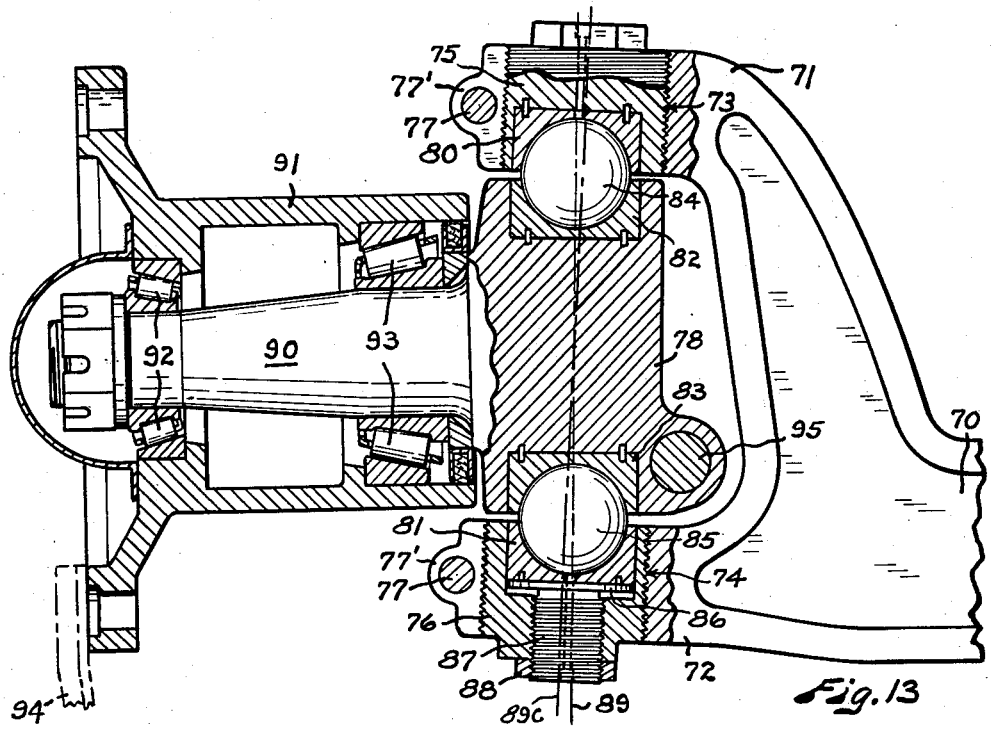
Fig. 13
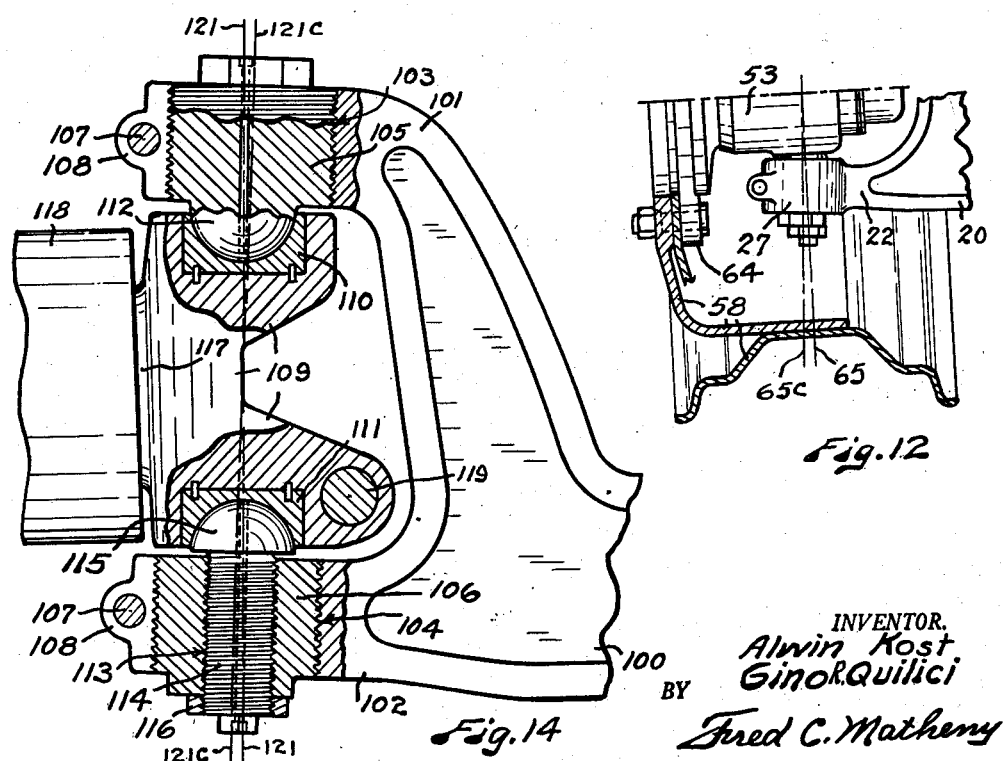
Fig. 14
Fig. 12
INVENTOR.
Alwin Kost,
Gino R. Quilici
BY
Fred C. Matheny
ATTORNEY

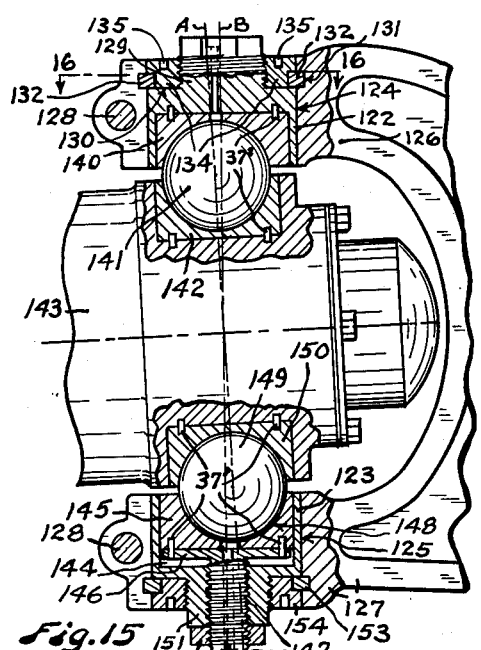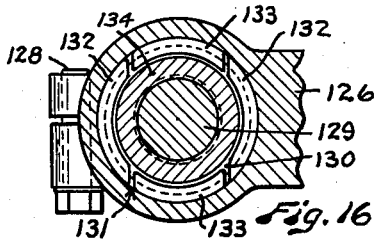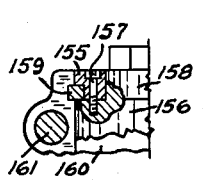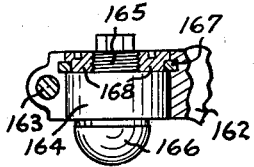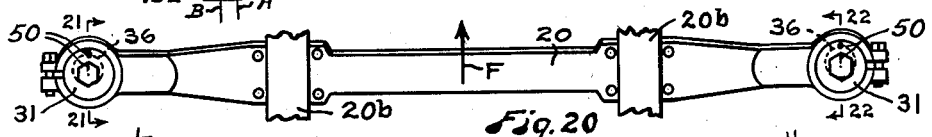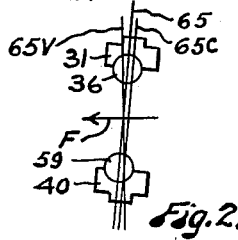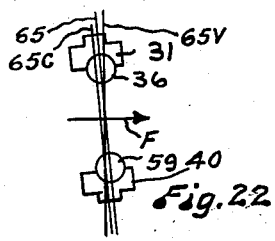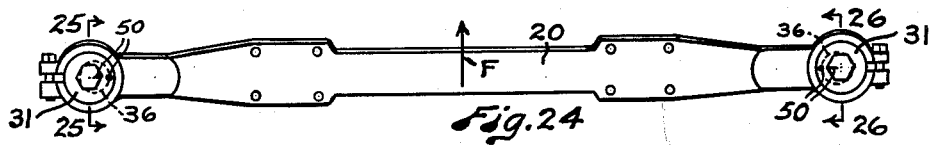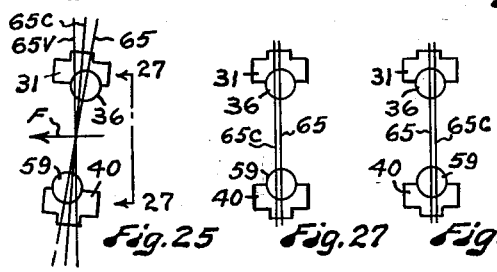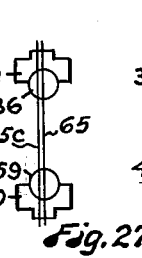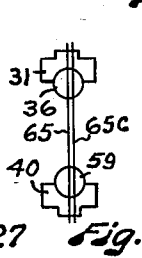
INVENTOR.
Alwin Kost
Gino R. Quilici
BY Fred C. Matheny
ATTORNEY

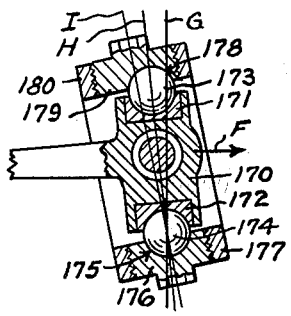
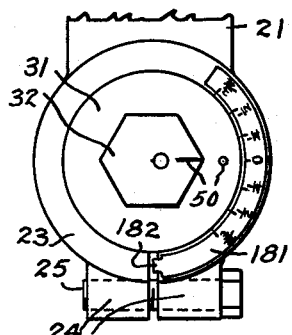
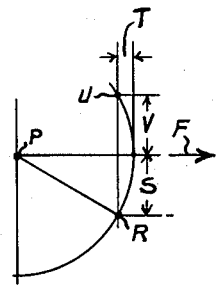
Fig. 29   Fig. 30   Fig. 31
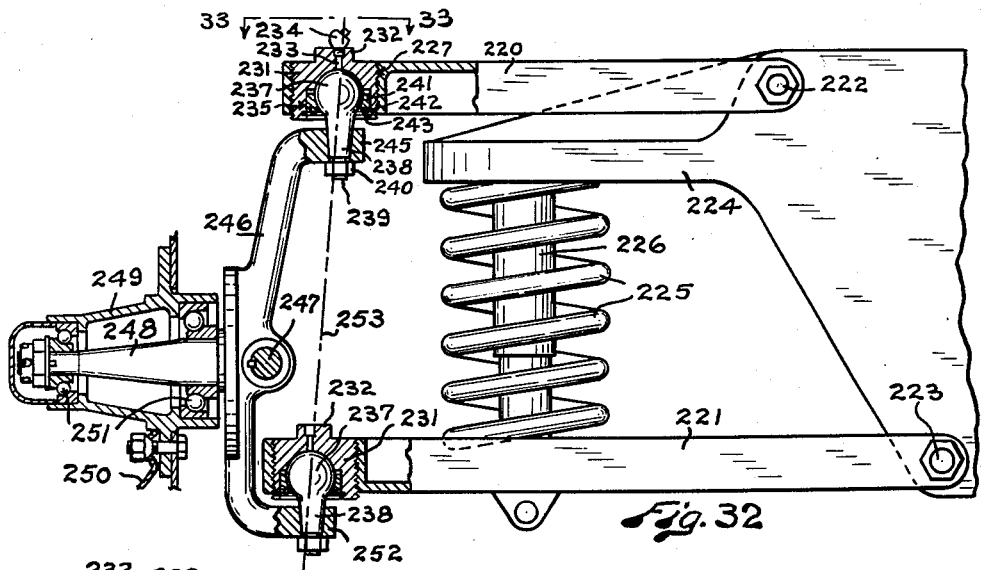
Fig. 32
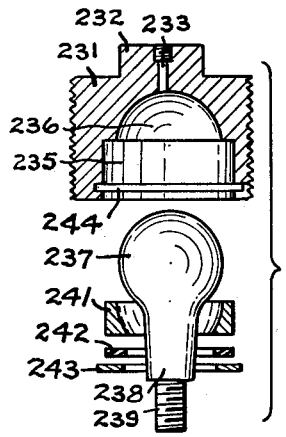
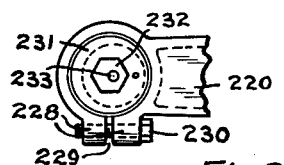
Fig. 34   Fig. 33
INVENTOR.
Alwin Kost
Gino R. Quilici
BY Fred C. Matheny
ATTORNEY United States Patent Office 2,923,555
Patented Feb. 2, 1960

ECCENTRICALLY ADJUSTABLE VEHICLE FRONT WHEEL MOUNTING DEVICES

Alwin Kost and Gino P. Quilici, Portland, Oreg., assignors to Kost Multiple X, Inc., Portland, Oreg., a corporation of Oregon Application October 2, 1953, Serial No. 383,890

3 Claims. (Cl. 280—96.1)

This invention relates to vehicle front wheel mounting devices.

An object of this invention is to provide efficient mounting devices or suspension means for steerable vehicle wheels which provides for precision adjustment of the caster and camber and for wear take-up of the wheels without dis-assembly of any of the parts and without any deformation of any of the parts, such as may result from twisting or heating and bending.

Another object is to provide a steerable wheel mounting or suspension which is simple as respects manufacture, assembly, adjustment and maintenance and one which makes it possible to provide, in a vehicle, good stability, minimum tire slippage, maximum tire wear and good handling characteristics.

Another object is to provide wheel mounting or suspension means having readily operable caster and camber adjusting devices and which is applicable to truck wheel mountings in which the steering axis lies substantially in the medial plane of the wheel or to conventional passenger car wheel mountings using so called individual "A-frame" wheel suspension in which the steering axis is offset inwardly from the plane of the wheel.

Axles and wheel suspension means are usually made so that when they are assembled the wheels will have substantially the correct amount of caster and camber. However, it is usually not possible to adjust the camber without springing or bending the axle and after assembly it is often found that a little less or a little more caster or camber would improve the performance of the vehicle if the axle could be readily adjusted. This invention makes it possible to quickly and easily adjust either the caster or the camber or both the caster and the camber any desired amount by the same adjusting means and further makes it possible to adjust the camber without springing or bending or heating the axle and thus weakening said axle.

Even if a vehicle is made so that the front wheels have the proper caster and camber when the vehicle is new it often happens that, in use, an axle will be slightly bent due to the wheel striking an object when the vehicle is heavily loaded. This usually puts a negative camber in the wheel or causes it to lean outwardly a slight amount downwardly considered. This negative camber causes excessive tire wear and usually interferes with steering by tending to push the vehicle in the opposite direction from the negatively cambered wheel. To restore the correct camber, under these conditions, the usual method of procedure is to bend the axle back, as nearly as possible, to its original shape. This bending stresses and weakens the axle and may later result in axle failure. Also this bending of the axle takes considerable time and requires the use of special tools and it is practically impossible to get exactly the correct camber setting in this way. The adjusting means herein disclosed makes it possible, under these conditions, to accurately restore the correct camber to the axle quickly and easily and without attempting to bend the axle back to its original setting.

Usually roads slope downwardly from the center outwardly and this tends to cause vehicles, especially trucks, to run toward the outer side of the road. Under this condition it has been found that, if the right wheel has a little more caster than the left wheel, usually about one half of one degree more, it will help to overcome the tendency of the vehicle to pull sidewise. Where I-beam axles are used it has heretofore been common practice to provide this extra caster by using about one half of one degree more wedge between the right spring and the adjacent part of the axle. To obtain more caster at the right wheel in this way it is necessary to put a permanent twist in the axle. If an axle does not take a twist when thus wedged the spring will be deflected and this deflection of the spring will not add any caster to the said desired wheel. If the axle is thus twisted and the desired extra caster obtained the axle is placed under a permanent torque stress and must operate under this stress and is more liable to fail. In the event the axle is of tubular construction it would be substantially impossible to thus obtain even one half of one degree excess caster of the right wheel by twisting said axle. The adjusting means herein disclosed provides for quickly and easily adjusting the caster of wheels any desired amount, within predetermined limits, without requiring any twisting or additional stressing of an axle.

Further objects of this invention are to provide caster and camber adjusting devices which are particularly well adapted for embodiment in wheel mounts built with a substantially correct pre-set caster, the adjusting devices being operable, without any dis-assembly of the wheel mount, to increase or decrease the pre-set caster and to correct for undesirable changes of this pre-set caster brought about by use and to adjust camber in either direction and to further adjust toe-in and toe-out of the wheels.

A still further object is to provide a front wheel mount in which two spaced apart eccentrically adjustable spherical bearings are used in such a manner as to provide for infinite caster and camber adjustment in any desired direction of a generally upright but slightly inclined steering axis.

Other objects of the invention will be apparent from the following description taken in connection with the accompanying drawings.

Figure 1 is a vertical sectional view, with parts in elevation, of a steerable front wheel suspension or mount having this caster and camber adjusting means embodied therein, the adjusting means being shown in a position in which maximum positive camber of the wheel is provided.

Fig. 2 is a fragmentary top plan view looking down on the uppermost adjusting unit, as indicated by broken line 2—2 of Fig. 1.

Fig. 3 is a fragmentary bottom plan view looking up at the lower adjusting unit, as indicated by broken line 3—3 of Fig. 1.

Fig. 4 is a vertical sectional view, with parts in elevation, taken substantially through the axis of the mounting means, and showing the adjusting units positioned to obtain maximum caster in one direction, this being a different position of the adjusting units from the position shown in Figs. 1, 2 and 3.

Fig. 5 is a fragmentary top plan view looking in the direction of broken line 5—5 of Fig. 4.

Fig. 6 is a fragmentary bottom plan view looking in the direction indicated by broken line 6—6 of Fig. 4.

Fig. 7 is a detached view, partly in elevation and partly in section, showing an upper cylindrical bearing member.

Fig. 8 is a bottom plan view of the bearing member shown in Fig. 7.

Fig. 9 is a detached vertical sectional view of a lower cylindrical bearing member.

Fig. 10 is a top plan view of the bearing member shown in Fig. 9.

Fig. 11 is a detached view in elevation of a bearing cup adjusting screw.

Fig. 12 is a view partly in section and partly in elevation of the wheel mounting means shown in Fig. 1 illustrating how the medial plane of the wheel is substantially coincident with the steering axis.

Fig. 13 is a vertical sectional view, with parts in elevation, showing this invention applied to a conventional wheel with a non-rotating axle, and in which the wheel has its medial plane offset to one side of the steering axis.

Fig. 14 is a vertical sectional view, with parts in elevation, showing a modified form of the invention using eccentrically positioned adjustable semi-spherical pivot devices.

Fig. 15 is a view partly in vertical section and partly in elevation showing means of modified form for securing rotatively adjustable bearing members in spaced apart axle arms without threading the bearing members into the axle arms.

Fig. 16 is a sectional view, with parts in plan, taken substantially on broken line 16—16 of Fig. 15.

Fig. 17 is a somewhat diagrammatic view illustrating various shapes of keys or bearing holding devices which may be used to hold the cylindrical bearing members shown in Figs. 15 and 16.

Fig. 18 is a fragmentary view, partly in section and partly in elevation, showing how screws may be used to fasten a securing ring of the type shown in Figs. 15 and 16 to a cylindrical bearing member.

Fig. 19 is a view partly in section and partly in elevation illustrating securing ring and locking means similar to that shown in Fig. 15 and showing a cylindrical bearing member of modified form having an eccentrically positioned integral semi-spherical bearing element thereon.

Fig. 20 is a somewhat diagrammatic plan view of a complete axle and showing a zero setting of the cylindrical bearing members in which the initial caster and camber of the wheel mounting devices is unchanged.

Fig. 21 is a diagrammatic view, with parts omitted, looking in the direction indicated by broken line 21—21 of Fig. 20.

Fig. 22 is a diagrammatic view, with parts omitted, looking in the direction of broken line 22—22 of Fig. 20.

Fig. 23 is a fragmentary view, partly in section and partly in elevation illustrating a conventional application of a wedge plate between a spring and an axle beam to provide initial caster in a front wheel mounting.

Fig. 24 is a view similar to Fig. 20 showing a different initial or zero position of the cylindrical bearing members.

Fig. 25 is a diagrammatic view, with parts omitted looking in the direction indicated by broken line 25—25 of Fig. 24.

Fig. 26 is a diagrammatic view, with parts omitted, looking in the direction of broken line 26—26 of Fig. 24.

Fig. 27 is a diagrammatic view, with parts omitted, looking in the direction indicated by broken line 27—27 of Fig. 25.

Fig. 28 is a diagrammatic view, with parts omitted, looking in the direction indicated by broken line 28—28 of Fig. 26.

Fig. 29 is a vertical sectional view showing wheel mounting means in which one only of the bearings, in this instance the upper bearing, is eccentrically adjustable and in which the other bearing provides for wear take-up but is not capable of caster and camber adjustment.

Fig. 30 is a fragmentary plan view illustrating the application of a pre-calibrated removable scale to an axle arm and eccentrically adjustable bearing member to facilitate caster and camber adjustment of the bearing member.

Fig. 31 is a diagram illustrating the relation between the caster and camber adjustment when the zero or starting position is the position shown in Fig. 20 and showing how substantial camber adjustment may be obtained from this position with little or no variation of the caster adjustment.

Fig. 32 is a view partly in section and partly in side elevation illustrating an application of this invention to a conventional A-frame individual wheel suspension of a type commonly used in automobiles.

Fig. 33 is a fragmentary top plan view looking in the direction of broken line 33—33 of Fig. 32 and showing the upper bearing member and part of the axle arm.

Fig. 34 is an exploded view, partly in section and partly in side elevation, showing a cylindrical bearing member and a ball type pivot member and means for holding said bearing member and pivot member in assembled relation, all of which parts are shown in Fig. 32.

Like reference numerals designate like parts throughout the several views.

The embodiment of this invention shown in Figs. 1 to 12 inclusive and further diagrammatically illustrated in Figs. 20 to 28 inclusive will first be described. This structure comprises a front vehicle supporting axle 20 having forked ends, each of which comprises two vertically spaced apart axle arms 21 and 22. The upper axle arm 21 carries the weight load placed on the axle 20 and the lower axle arm 22 cooperates chiefly as a stabilizer means. The upper axle arm 21 terminates in a split head 23 having two spaced apart flanges or lugs 24 connected by a transverse clamping screw 25. The head 23 has an upright, internally threaded, socket or passageway 26 of relatively large diameter. The lower axle arm 22 terminates in a split head 27 having two spaced apart transversely extending lugs 28 connected by a clamp screw 29. The lower split head 27 also has an upright, internally threaded, socket or passageway 30 of relatively large diameter and which is preferably axially aligned with the passageway 26 in the upper head 23.

An externally threaded cylindrical bearing member 31 is rotatively adjustably disposed in the internally threaded passageway 26 of the head 23 of the upper axle arm 21 and can be locked in any desired adjusted position therein by tightening the clamp screw 25. The cylindrical bearing member 31 has a head 32, preferably of hexagon shape, by which said member 31 is turned to adjust it. The inner end of the cylindrical bearing member 31 has an eccentrically positioned cylindrical recess 33, Figs. 7 and 8, for the reception of an externally cylindrical bearing cup 34. The common axis of the recess 33 and bearing cup 34 is transversely offset a predetermined distance relative to the axis of the cylindrical bearing member 31 and is preferably parallel to the axis of said cylindrical bearing member 31. The bearing cup 34 is provided with a semi-spherical recess 35 which fits over a spherical bearing member or ball 36. Dowel pins 37 prevent rotation of the bearing cup 34 in the member 31. Registering lubricant passageways 38 and 39 are provided respectively in the plug 31 and bearing member 34.

The lower axle bracket 22 has an externally threaded cylindrical bearing member 40 adjustably rotatively disposed within the socket 30 thereof and this plug member 40 can be locked in any desired adjusted position by tightening the cap screw 29. The lower cylindrical bearing member 40 has a head 41 on its lower end by which it may be turned. Also this bearing member 40 has a cylindrical recess 42, Figs. 9 and 10, in its upper end for the reception of an externally cylindrical spherically recessed bearing cup 43. The bearing cup 43 rests on a disc shaped flange 44, Fig. 11, of a bearing take-up screw 45. The take-up screw 45 is also a compensating screw in that it compensates for vertical movement of the bearing members 31 and 40 incidental to their rotary adjustment. The compensating screw 45 is threaded through a passageway 46 in the cylindrical bearing member 40 and is co-axial with the recess 42. A head 47 of suitable shape to receive a wrench is provided on the outer end of the compensating screw 45 and a lock nut 48 serves to lock the screw 45 to the cylindrical bearing member 40. Stud pins 49 on the flange 44 enter suitable holes in the bearing cup 43 and prevent said bearing cup from turning. Registering lubricant passageways 51 and 52 are provided respectively in the bearing cup 43 and screw 45.

A load carrying member 53 in the form of a tubular housing is positioned between the upper and lower axle arms 21 and 22. The load carrying member 53 has two diametrically opposite external cylindrical recesses 54 and 55 for the reception of two semi-spherically recessed bearing cups 56 and 57. Dowel pins 37 prevent rotation of the bearing cups 56 and 57 in the recesses 54 and 55. The semi-spherical recesses in the upper bearing cups 34 and 56 receive the spherical bearing member 36 and the similar recesses in the lower bearing cups 43 and 57 receive a similar spherical bearing member or ball 59. The two balls 36 and 59 are shown to be of the same size but it will be understood that their sizes may vary and that one of said balls may be larger than the other. Also it will be understood that the eccentricity or offset of the two balls 36 and 59 relative to the common axis of the cylindrical bearing members 31 and 40 may be varied. The bearing cups 34, 43, 56 and 57 may be molded of suitable wear resistant material and are quickly and easily replaceable when the structure is disassembled. These cups may be grooved internally to promote circulation of lubricant if desired. A common axis 65 of the two balls 36 and 59 is the axis about which steering movement takes place and this axis 65 is adjustable relative to a common axis 65c of the two rotatively adjustable bearing members 31 and 40.

Preferably one or more marks 50, Figs. 2 and 5, are provided on the upper end portion of the cylindrical bearing member 31 to indicate the direction of offset or eccentricity of the center of the bearing cup 34 therein and at least one similar marker 69 is provided on the lower end portion of the lower cylindrical bearing member 40, Figs. 3 and 6, for a like purpose.

An axle 60 is rotatively mounted in the tubular load carrying member 53 by suitable bearing means, such as two radial type roller bearings 61 and 62 and a roller thrust bearing 63. A wheel mounting flange 64 is integral with the outer end portion of the axle 60. When a wheel 58, Fig. 12, is mounted on the flange 64 the medial plane of said wheel is preferably coincident with the steering axis 65 which passes through the centers of the two spherical bearings 36 and 59. A suitable washer 66 and nut 67 are provided on the inner end portion of the axle inwardly from the thrust bearing 63 to hold the several parts in assembled relation. A steering arm 68, Fig. 4, is rigid with the load carrying member 53.

In the showing in Figs. 1, 2 and 3 the upper ball 36 is positioned a maximum distance outwardly or outboard and the lower ball 59 is positioned a maximum distance inwardly or inboard. This provides maximum positive camber and would be a position seldom used in practice. In this maximum camber position of the parts the original caster position has not been changed. Angular movement of both cylindrical bearing members 31 and 40 one hundred eighty degrees away from the positions in which they are shown in Figs. 1, 2 and 3 would provide a maximum negative camber setting without change in caster position.

Maximum caster in one or a positive direction is obtained by setting the markers 50 and 69 in the position shown in Figs. 4, 5 and 6 while maximum caster in the other or negative direction would be obtained by angularly moving both markers 50 and 69 one hundred eighty degrees from the position in which they are shown in Figs. 4, 5 and 6.

If the two markers 50 and 69 are relatively positioned so that the marker 50 is directly above the marker 69 then the axis of the two balls 36 and 59 will be parallel to the axis of the two cylindrical bearing members 31 and 40 and the caster and camber setting inherent in the axle structure will not be modified or changed by the positioning of the eccentric adjusting means.

From the foregoing description it will be apparent that by selectively adjusting the two bearing members 31 and 40 angularly it is possible to obtain infinite adjustment, within the limits inherent in this device, of either caster or camber or both caster and camber. Vertical movement of the cylindrical bearing members 31 and 40, incident to their rotative adjustment, and due to their threaded engagement within the respective axle arms 21 and 22 is compensated for by adjustment of the screw 45. Also this screw provides adjustment for take-up due to wear. Any slight variations which may be produced by the use of this adjusting means in the distance between the front wheels on opposite sides of the vehicle can easily be compensated for by tie-rod adjustment.

Fig. 13 illustrates an application of this invention to a conventional wheel in which the medial plane of the wheel is positioned a substantial distance outwardly, that is to the left, from the axis about which said wheel is angularly moved in steering. Said Fig. 13 shows a vehicle supporting axle 70 having two vertically spaced apart axle arms 71 and 72 provided respectively with internally threaded passageways 73 and 74. Two externally threaded cylindrical bearing members 75 and 76 are adjustably disposed in the respective passageways 73 and 74 and may be locked in adjusted positions by screws 77 operating in lugs 77' similar to the previously described lugs 24 and 28. A load carrying member 78 is disposed between the two axle arms 71 and 72. Two inwardly facing semi-spherically recessed bearing cups 80 and 81 are eccentrically mounted respectively in the inner end portions of the cylindrical bearing members 75 and 76. Two outwardly facing semi-spherically recessed bearing cups 82 and 83 are mounted in the respective end portions of the load carrying member 78 and positioned respectively in registration with the bearing cups 80 and 81. Two spherical bearing members or balls 84 and 85 are freely rotatively disposed in the registering semi-spherical recesses of the upper and lower bearing cups. The bearing cup 81 rests on the flange 86 of an adjusting screw 87 which is threaded through the lower cylindrical bearing member 76 and has a lock nut 88 thereon. The parts 70 to 88 inclusive are similar to parts hereinbefore described in connection with Figs. 1 to 12. Also they are operable in a similar manner as they support the load carrying member 78 for angular steering movement and provide for quick and easy caster and camber adjustment on a steering axis 89 common to the centers of the two bearing members 84 and 85 without any dis-assembly of the wheel mounting parts.

The load carrying member 78 of Fig. 13 has a nonrotatable axle 90 rigid therewith and extending transversely therefrom. A conventional type wheel hub 91 is rotatively mounted on the axle 90 by roller bearings 92 and 93 and a wheel 94, a fragment only of which is shown, is secured to the hub 91. The medial plane of the wheel 94 is normally positioned a substantial distance outwardly from the steering axis 89. A steering arm 95 is secured to the load supporting member 78. The operation of the adjusting means shown in Fig. 13 is similar to the operation of the adjusting means shown in Figs. 1 to 12 and previously described. The axis 89 is adjustable relative to the common axis 89c of the bearing members 75 and 76.

Fig. 14 shows a modification of this invention in which pivot bearings of a different type are provided. Said Fig. 14 shows a vehicle supporting axle 100 having two vertically spaced apart split axle arms 101 and 102 provided respectively with internally threaded passageways 103 and 104. Two externally threaded bearing members 105 and 106 are rotatively adjustably disposed in the respective passageways 103 and 104 and may be locked in adjusted positions by screws 107 operating in lugs 108. A load carrying member 109 is disposed between the two axle arms 101 and 102. Two outwardly facing semi-spherically recessed bearing cups 110 and 111 are mounted in the respective end portions of the load carrying member 109. The upper cylindrical bearing member 105 has an eccentrically positioned, integrally formed, semi-spherical bearing element 112 on its lower or inner end. This bearing member 112 is seated within the upper bearing cup 110 in the load carrying member 109. The load on the vehicle supporting axle 70 is carried on the bearing formed by member 112 and cup 110.

The lower cylindrical bearing member 106, Fig. 14, has an eccentrically positioned internally threaded longitudinally extending hole 113 therein. A compensating screw 114 is threaded into the hole 113 and has a semi-spherical bearing head 115 which is seated in the lower bearing cup 111. A lock nut 116 is provided on the lower end portion of the screw 114. The load carrying member 109 has a transversely extending rigid axle 117 upon which a wheel hub 118 is rotatively mounted in the manner shown in Fig. 13 and previously described. A steering arm 119 is secured to the load carrying member 109.

The semi-spherical bearing members 112 and 115, being eccentrically positioned relative to the respective members 105 and 106, will provide angular caster and camber adjustment of a steering axis indicated by broken line 121 and which is common to the centers of the two bearing members 112 and 115. The axis 121 is adjustable relative to the common axis 121c of the rotatively adjustable bearing members 105 and 106.

In Fig. 4 and in several figures hereinafter described an arrow F is used to indicate a forward direction.

Fig. 15 shows a modification of this invention in which devices are provided for securing rotatively adjustable cylindrical upper and lower bearing members 122 and 123 respectively in suitable non-threaded cylindrical passageways 124 and 125 in the upper and lower split axle arms 126 and 127 of an axle. The arms 126 and 127 have their split end portions connected by clamp screws 128. The upper bearing member 122 has an upwardly extending centrally positioned externally threaded integral shank 129 of substantially smaller diameter than said member 122. The upper end portion of the shank 129 is shaped to receive a wrench. A relatively wide shoulder 130 is formed at the upper end of the member 122 around the shank 129. An annular groove 131 is provided in the wall of the passageway 124 in the split end portion of the axle arm 126 for the reception of bearing member holding devices or keys 132 and 133, see also Fig. 16. The bearing member holding devices 132 and 133 are of substantially square cross section and have ends shaped substantially as shown in Fig. 16 to facilitate assembly. The ends of the two members 132 are in planes substantially parallel to the length of said members 132 and the ends of the other two members 133 are in planes substantially at right angles to the length of said members 133. This makes it possible, in assembly, to first insert the two members 132 at opposite locations in the annular groove 131 and then insert the two members 133 and move them outwardly into the groove 131 between the members 132. The key members 132 and 133 lie partly in the grooves 131 and partly in the passageway 124 and the top shoulder 130 of the bearing member 122 rests against said key members 132 and 133. The key members 132 and 133 hold the cylindrical bearing members 122 against longitudinal movement in the axle arm 126. These members 132 and 133 have enough clearance between their adjacent ends to allow for clamping of the bearing member 122 by tightening of the screw 128.

An internally threaded retaining ring 134 fits within the upper end of the passageway 124 and is threaded onto the shank 129 and has an annular notch in its lower end which fits over the key members 132 and 133. The ring 134 has holes 135 in its outer side to receive a spanner type wrench whereby it may be tightened on the shank 129 and thus cooperate in preventing endwise movement of the cylindrical bearing member 122. The external diameter of the retaining ring 134 and bearing member 122 are the same so that tightening of the screw 128 will securely clamp both the ring 134 and the member 122. The key members 132, 133 permit the ring 134 and bearing member 122 to be rotated as a unit when the screw 128 is loosened.

Fig. 17 shows four types of key members 136, 137, 138 and 139 of different shapes from the key members 132 and 133 but which are adapted to be used in the same manner as the key members 132 and 133. The key members 136 and 137 are rectangular in cross section. The key member 138 is cylindrical in cross section. The key member 139 is a ball. The key members 136, 137 and 138 are all similar in plan to the key members 132 and 133 and have their ends similarly formed to facilitate assembly. The annular grooves to receive key members of the shapes shown in Fig. 17 are necessarily formed to conform to the shape of the key members for which they are intended.

The cylindrical bearing member 122 has a bearing cup 140 provided with an eccentrically positioned semi-spherical recess which fits over a ball 141. The ball 141 also seats within a suitable recess in another bearing cup 142 which is embedded in a load carrying member 143 of a type hereinbefore described in connection with Fig. 1.

The lower rotatively adjustable cylindrical bearing member 123, Fig. 15, has a recess 144 within which is a longitudinally adjustable bearing cup 145 which rests on an adjusting plate 146. The adjusting plate 146 is connected with an adjusting screw 147 which has a preferably square lower end to receive a wrench. The upper end of the bearing cup 145 has an eccentrically positioned semi-spherical recess 148 within which a ball 149 is received. It is to be noted that eccentric positioning of the balls in Fig. 15 is provided by eccentrically positioning the ball receiving recesses in the bearing cups 140 and 145, as contrasted to the structure of Figs. 1, 13 and 14, in which the ball receiving recesses in the bearing cups are concentric relative to the cups but the said cups are eccentrically positioned in the rotatively adjustable bearing members. The previously mentioned lower ball 149 is received within a bearing cup 150 which is embedded in the load carrying member 143. The adjusting screw 147 is axially aligned with the bearing member 123 and said screw is threaded through an integral shank 151 which protrudes from the lower end of said bearing member 123. A lock nut 152 provides for locking the adjusting screw 147 in any desired adjusted position in the shank 151. The parts 123, 145, 146 and 147, when locked together by the nut 152 and connected by dowel pins 37' can be turned as a unit to provide caster and camber adjustment when clamp screw 28 is loosened. The cylindrical bearing member 123 is supported against longitudinal movement in the passageway 125 of lower axle arm 127 by key means 153 and a retaining ring 154 which are similar to the previously described key means 132, 133 and retaining ring 134. The retaining ring 154 is threaded onto the shank 151, Rotatively adjusting the upper and lower cylindrical bearing members 122 and 123 of Fig. 15 will provide adjustment of the common axis A of the balls 141 and 149 relative to the common axis B of the bearing members 122 and 123. The axes A and B of Fig. 15 correspond to the respective axes 65 and 65c of Figs. 1 and 4 and hereinafter described Figs. 20 to 28 inclusive. In the Fig. 15 construction rotary adjustment of the bearing members 122 and 123 does not disturb or change the longitudinal adjustment of these bearing members as it would if they were threaded into the axle arms 126 and 127.

Fig. 18 shows a retaining ring 155 which is similar to the rings 134 and 154 of Fig. 15 except that it is not internally threaded but is attached to a cylindrical bearing member 156 by screws 157. The bearing member 156 has a non-threaded shank 158 over which the ring 155 fits. Key means 159 and axle arm 160 and clamp screw 161, shown in Fig. 18, are similar to the respective parts 132, 126 and 128 shown in Fig. 15.

Fig. 19 shows bearing member holding means of the type illustrated in Fig. 15 applied to a rotatively adjustable bearing member of the type illustrated in Fig. 14. Said Fig. 19 shows an upper axle arm 162, a clamp screw 163, a rotatively adjustable cylindrical bearing member 164 having an upwardly extending externally threaded shank 165, a downwardly extending integral semi-spherical eccentrically positioned bearing element 166 on the bearing member 164, key means 167, and a retaining ring 168 threaded onto the shank 165.

The operation of this eccentrically adjustable front wheel mounting means has been previously explained in a general way but will be more fully explained in connection with diagrammatic Figs. 20 to 28 inclusive. Said Figs. 20 to 28 show parts of the structure illustrated in Figs. 1 to 12 but are equally illustrative of the operation of the structure of Figs. 13 to 19 and 29 to 34.

Figs. 20, 21 and 22 illustrate how camber can be adjusted without adjusting caster. Fig. 20 shows an entire front axle 20 with duplicate wheel mounting means at each end thereof. In said Fig. 20 the rotatively adjustable bearing members 31 at the respective ends of the axle 20 are shown in a position in which their markers 50 point directly forwardly, as indicated by arrow F, instead of pointing outwardly as they would in the position shown in Figs. 1 and 2. In said Fig. 20 it is a further assumed that the markers of the lower rotatively adjustable bearing members are set to point directly forward. In this Fig. 1 position the upper and lower balls 36 and 59, see also Figs. 21 and 22, are positioned with their common axis 65 directly forward of and parallel to the pre-set inclined common axis 65c of the rotatively adjustable bearing members 31 and 40. In this position or in any other position where the common axis 65 of the two balls 36 and 59 and the common axis 65c of the two bearing members 31 and 40 are in the same general upright plane these axes will be parallel and the initial caster and camber setting provided in the axle structure will not be modified by this adjusting means. As previously pointed out an initial, substantially correct, caster setting is provided at the time vehicles are assembled by inclining the steering or king pin axis the correct amount. For the purpose of this explanation it is assumed that this pre-set axis is parallel with the axis 65c of the bearing members 31 and 40. Fig. 23 illustrates a conventional manner of placing wedge means 20a between the axle and a spring 20b on said axle, with the thick end of the wedge toward the rear to thus provide a pre-set caster incline, as indicated by line 20c relative to a vertical 20d.

Figs. 21 and 22, looking inboard or toward the vehicle from the left and right sides respectively illustrate the pre-set caster incline of the upright axes 65c of the bearing members 31 and 40 relative to the normally vertical central plane or axis 65v of the wheel. Also these two Figures 21 and 22 illustrate the parallel relationship of the two axes 65 and 65c when the parts are in the position illustrated in Fig. 20.

With the markers 50 in the initial or zero position of Fig. 20, as just described, neither the pre-set caster angle or the pre-set camber angle (which usually is zero, that is the wheel is in a vertical plane when pointed straight ahead), are changed. To vary the camber angle in either direction from the Fig. 20 position without changing the pre-set caster angle, the upper and lower bearing members 31 and 40 are rotatively adjusted equal amounts in opposite directions. When this is done the upright plane common to the centers of the two balls 36 and 59 will always be parallel to an upright plane coincident to the axis 65c and transverse to the vehicle. The greatest possible camber adjustment, without change of caster, is obtained by oppositely rotating the two bearing members 31 and 40 ninety degrees from the assumed zero position of Fig. 20. This would position the two balls 36 and 59 on opposite sides of the axis 65c laterally of the vehicle. Also this would be the position shown in Fig. 1. Obviously, if the setting assumed in Fig. 20 is a zero camber setting in which the wheel is vertical when in a position for straight ahead movement of the vehicle, then opposite angular adjustment of bearing members 31 and 40 in one direction will provide positive camber and opposite angular adjustment of said bearing members in the other direction will provide negative camber.

Figs. 24 to 28 inclusive show how caster can be adjusted without adjusting camber. As a starting position Fig. 24 shows the upper bearing members 31 set with their markers 50 pointing directly inboard and it is assumed that the lower bearing members 40 are similarly set. In this position the axes 65 of the balls 36 and 59 would be parallel to and inwardly from the axes 65c of the bearing members 31 and 40. Starting from this position it is possible to increase or decrease caster without deviating camber by rotatively moving the upper and lower cylinders equal amounts in opposite directions. The result is that the axis 65 of the balls 36 and 59, considered longitudinally of the vehicle, remains in a plane which is parallel to the plane of the axis 65c of the bearing members 31 and 40, as indicated in Figs. 27 and 28, and camber remains unchanged. At the same time, considered transversely of the vehicle the angle of axis 65 relative to axis 65c is changed, that is, increased or decreased, depending on the direction of rotative adjustment of the bearing members 31 and 40. If rotation is in the proper direction to increase caster and line 65v in Figs. 25 and 26 indicates a true vertical, then the initial or pre-set caster angle would be represented by the angle between 65v and 65c and the added caster would be represented by the angle between 65c and 65 thereby providing a new and increased caster angle equal to the angle between 65v and 65.

It is possible, starting from an initial position as shown in Fig. 20, to rotatively adjust either an upper or a lower bearing member for some change of camber without much deviation of caster. Likewise, starting from an initial position as shown in Fig. 24, it is possible to adjust either an upper or a lower bearing member for some change of caster without much deviation of camber. Also an upper and a lower bearing member can be rotatively moved different amounts either in opposite directions or in the same direction to obtain various combination of caster and camber.

It is also possible to adjust toe-in and toe-out of the wheels, without changing the caster or camber adjustment, by rotatively moving the upper and lower bearing members equal amounts in the same direction. This moves the two wheels toward or away from each other and results in a toe-in or toe-out adjustment because the wheels are connected with the usual tie rod means. This toe-in and toe-out adjustment just hereinbefore described may be combined with the usual adjustment provided in connection with some tie rods and a finer or infinite toe-in and toe-out adjustment thus obtained. Also it will be understood that the adjustment provided in conventional tie rods may be used to compensate for undesirable toe-in and toe-out variations which may result from caster and camber adjustments made with this apparatus.

Fig. 29 illustrates an embodiment of this invention in which one only of the bearing members of the wheel mounting device is eccentrically adjustable and the other bearing member thereof is non-adjustable as respects its caster and camber axis. Said Fig. 29 shows a load carrying member 170 having bearing cups 171 and 172 carrying balls 173 and 174. The lower ball 174 is received within a concentrically positioned lower bearing cup 175 in a cylindrical bearing member 176 which is threaded into a split end portion of a lower axle arm 177. The upper ball 173 is positioned in an upper bearing cup 178 in an upper cylindrical bearing member 179 which is threaded into a split end portion of an upper axle arm 180. The lower bearing member 176 is vertically adjustable for wear take up. The upper bearing member 179 is rotatively adjustable for variations of caster and camber.

In Fig. 29 the arrow F indicates the forward direction. The line or axis G is vertical. The axis H is the steering axis common to the balls 173 and 174 and corresponding to the previously described axis 65. The axis I is the common axis of the two bearing members 179 and 176 and corresponds to the previously described axis 65c. The two axes H and I intersect at the center of the lower ball 174 and the vertical axis G is shown as passing through this same center. The parts in Fig. 29 are preferably constructed so that when the upper ball 173 is in its maximum forward position the caster angle, this being the angle between axes G and H, is substantially correct. Rotatively moving the upper bearing member 179 in either direction away from this maximum forward position will adjust the camber without much variation of the caster.

Fig. 30 illustrates the application of a pre-calibrated removable scale 181 to the split end part 23 of an axle to serve as a guide with reference to which a bearing member 31 may be rotatively adjusted in the axle part 23. The scale 181 is an arcuately shaped piece of thin flat material having graduations thereon and having a pin 182 or like protrusion which is adapted to fit within the slot formed by the split in the axle part 23. The scale 181 rests on the top of the axle part 23 when it is in use and is properly positioned by the pin 182. Preferably the scale 181 is constructed and graduated in such a manner as to enable the user to set the marker means 50 of a bearing member 31 in an exact "forward" position and then adjust said bearing member a predetermined amount in either direction.

Fig. 31 is a diagram illustrating a relationship which will exist between caster and camber when a front wheel assembly is initially provided with a predetermined correct caster and with zero camber and is equipped with this adjusting means and when the adjusting means is set at a starting or zero position in which the common axis of the two balls is directly in front of the common axis of the two bearing members. If, from this position, the upper bearing member is moved clockwise to position the center of the upper ball coincident with point R while the lower ball remains stationary the camber adjustment resulting from this movement will be proportional to distance S while the change of caster will be much less and will be proportional to distance T. This condition could well be illustrative of Fig. 29 where the lower ball is not eccentrically adjustable. In structures such as those illustrated in Figs. 1 to 28 inclusive, and where both the upper and lower balls are eccentrically adjustable, if the center of the upper ball is coincident with point R and the center of the lower ball is moved counterclockwise an equal distance until it is coincident with point U then the total amount of camber adjustment obtained is proportional to the sum of the two distances S and V. However when this is done there is no change of the pre-set initial caster angle because the centers of the two balls are then an equal distance forwardly of the common center P of the two bearing members.

Figs. 32, 33 and 34 illustrate an application of this invention to a conventional type of individual front wheel suspension extensively used in automobiles.

Fig. 32 shows axle arms 220 and 221 hinged by pivots 222 and 223 to a fixed frame member 224. A compression spring 225 and shock absorber 226 are interposed between the frame member 224 and axle arm 221 so that the weight load on the frame member 224 is transmitted through the spring 225 to the lower axle arm 221. The outer end portion of the upper axle arm 220 has an internally threaded upright cylindrical passageway 227 and has two laterally extending lugs 228 with a slot 229 between said lugs and a screw 230 threaded through said lugs for clamping and locking purposes. The outer end portion of the lower axle arm 221 is of similar construction.

An externally threaded plug type cylindrical bearing member 231 is rotatively adjustably disposed in the internally threaded passageway 227 of the upper axle arm 220. The upper end part of the bearing member 231 has a hexagon head 232 and an oil passageway 233 receiving an oil fitting 234 for introduction of lubricant. The lower end portion of said bearing member 231, see Fig. 34, has an upwardly extending eccentrically positioned cylindrical receptacle 235 and further has a semi-spherical recess 236 at the upper end of the cylindrical receptacle 235, the semi-spherical recess 236 being eccentric as respects the bearing member 231. The receptacle 235 and recess 236 cooperate to receive a ball 237 on the upper end of a tapered shank 238. The lower end of the tapered shank 238 has a threaded extension 239 to receive a nut 240. A bearing member 241 and a synthetic rubber washer 242 and a retaining ring 243 cooperate to retain the ball 237 in the cylindrical bearing member 231 and help to provide a long wearing close fitting bearing for said ball. At the same time these parts provide for a reasonable amount of universal pivotal movement of the ball 237. The retaining ring 243 may be of the snap ring type and it seats within a suitable groove 244 in the bearing member 231.

The tapered shank 238 fits within a suitable tapered hole in an upper offset end part 245 of a load carrying member or axle bracket 246 and is secured to said part 245 by the nut 240. The load carrying member 246 has a steering arm 247 secured thereto. Also said load carrying member has a perpendicular fixed axle 248 upon which the hub portion 249 of a wheel 250 is rotatively mounted, as by ball bearings 251. The outer end portion of the lower axle arm 221 is supported from a transversely extending lower end part 252 of the load carrying member 246 by eccentrically adjustable connecting means of which the parts are duplicates of those used in connection with the upper axle arm and in which some of these parts are similarly numbered.

In the structure shown in Fig. 32 angular steering movement takes place about an axis 253 common to the centers of the two balls 237. The balls 237 are eccentrically positioned in the bearing members 231 and the steering axis 253 can be adjusted by rotative adjustment of the bearing members 231 as previously explained in connection with Figs. 1 to 28 inclusive. Thus means is provided for increasing or decreasing the camber or caster as respects the initial setting of the same.

The foregoing description and accompanying drawings clearly disclose preferred embodiments of this invention but it will be understood that these disclosures are merely illustrative and that changes may be made within the scope of the following claims.

We claim:
1. Mounting means for a motor vehicle wheel comprising two vertically spaced apart vehicle supporting axle arms rigid relative to each other; two axially aligned cylindrical bearing members rotatively adjustably mounted in the end portions of the respective axle arms with their common axis, upwardly considered, positioned at a rearward caster incline relative to the vertical; a hollow tubular load carrying member extending between said two rotatively adjustable bearing members; a wheel; an axle rigid with said wheel and rotatively supported within said tubular load carrying member; and two ball type bearing elements pivotally connecting said load carrying member with the respective rotatively adjustable cylindrical bearing members, said two bearing elements having a common axis coincident with the medial plane of the wheel and at least one of said bearing elements being eccentrically positioned relative to the axis of its cylindrical bearing member, whereby caster and camber adjustment of the wheel is provided by rotative adjustment of at least one cylindrical bearing member within an axle arm.

2. Mounting means for a motor vehicle wheel comprising a non-rotatable vehicle supporting axle having two vertically spaced apart arms rigid therewith, said arms having two substantially aligned cylindrical passageways therein; a hollow tubular load carrying member positioned between said spaced apart arms; a wheel; an axle rigid with said wheel and positioned within and rotatively supported by said load carrying member; a cylindrical bearing member rotatively adjustably supported in each of said axle arm passageways, each of said cylindrical bearing members having a bearing cup receiving recess in its inner end; releasable bearing member locking means operatively connected with each cylindrical bearing member; a bearing cup in each bearing cup receiving recess, each bearing cup having an inwardly directed semi-spherical bearing receptacle positioned eccentrically of the bearing member by which the bearing cup is carried; adjusting means connected with one of said bearing cups providing adjustment of one bearing cup longitudinally within its bearing member toward and away from the other bearing cup; and two bearings of at least partially spherical shape connected with said load carrying member at diametrically opposite points and seated within said eccentrically positioned semi-spherical bearing receptacles, whereby rotary adjustment of said cylindrical bearing members will angularly adjust the common axis of said two bearings and provide caster and camber adjustment of the wheel.

3. Mounting means for a motor vehicle wheel comprising a non-rotatable axle having two vertically spaced apart arms rigid therewith, each axle arm having a split end portion provided with an internally threaded normally vertical passageway; a clamping screw in the split end portion of each of said arms; a hollow tubular load carrying member positioned between said spaced apart axle arms; diametrically opposite outwardly facing semi-spherical bearing cups provided in said load carrying member; an externally threaded cylindrical bearing member rotatively adjustably supported in each of said axle arm passageways; an eccentrically positioned inwardly facing semi-spherical bearing cup provided in the inner end portion of each cylindrical bearing member in registration with the adjacent semi-cylindrical bearing cup of the load carrying member; screw means providing longitudinal adjustment of the bearing cup in one cylindrical member; two spherical bearings seated respectively within the two pairs of registering semi-spherical bearing cups, whereby rotary adjustment of the cylindrical bearing members in the axle arms will angularly adjust the common axis of said spherical bearings; a wheel positioned with its medial plane coincident with the common axis of said spherical bearings; and an axle rigid with said wheel and rotatively journaled within said tubular load carrying member and extending between the bearings formed by said bearing members and cups and balls.

References Cited in the file of this patent

UNITED STATES PATENTS

| | | |
|---|---|---|
| 996,473 | Estes | June 27, 1911 |
| 1,064,496 | Lagergren | June 10, 1913 |
| 2,253,436 | Leighton | Aug. 19, 1941 |
| 2,259,813 | Garnett et al. | Oct. 21, 1941 |
| 2,405,458 | Slack et al. | Aug. 6, 1946 |

FOREIGN PATENTS

| | | |
|---|---|---|
| 379,555 | France | Nov. 12, 1907 |
| 520,442 | France | June 25, 1921 |